(12) United States Patent
Dheeradhada et al.

(10) Patent No.: US 11,511,491 B2
(45) Date of Patent: Nov. 29, 2022

(54) MACHINE LEARNING ASSISTED DEVELOPMENT IN ADDITIVE MANUFACTURING

(71) Applicant: General Electric Company, Schenectady, NY (US)

(72) Inventors: Voramon Supatarawanich Dheeradhada, Latham, NY (US); Natarajan Chennimalai Kumar, Niskayuna, NY (US); Vipul Kumar Gupta, Guilderland, NY (US); Laura Dial, Clifton Park, NY (US); Anthony Joseph Vinciquerra, Rexford, NY (US); Timothy Hanlon, Glenmont, NY (US)

(73) Assignee: General Electric Company, Schenectady, NY (US)

( * ) Notice: Subject to any disclaimer, the term of this patent is extended or adjusted under 35 U.S.C. 154(b) by 965 days.

(21) Appl. No.: 16/184,481

(22) Filed: Nov. 8, 2018

(65) Prior Publication Data
US 2020/0147889 A1 May 14, 2020

(51) Int. Cl.
*B29C 64/393* (2017.01)
*B29C 64/10* (2017.01)
(Continued)

(52) U.S. Cl.
CPC ............ *B29C 64/393* (2017.08); *B29C 64/10* (2017.08); *G06F 30/17* (2020.01); *G06K 9/6296* (2013.01);
(Continued)

(58) Field of Classification Search
CPC ...... B29C 64/393; B29C 64/10; G06N 20/00; G06K 9/6296; G06F 30/17
(Continued)

(56) References Cited

U.S. PATENT DOCUMENTS 9,245,067 B2 * 1/2016 Subramaniyan ........ G06F 30/20
9,855,698 B2    1/2018 Perez et al.
(Continued)

FOREIGN PATENT DOCUMENTS

EP    3316156 A1 *  5/2018   ........... G05B 19/401
EP    3651053 A1 *  5/2020   ........... B29C 64/393
(Continued)

OTHER PUBLICATIONS

Ling et al. ("An intelligent sampling framework for multi-objective optimization in high dimensional design space", AIAA, 2018, pp. 1-10) (Year: 2018).*
(Continued)

*Primary Examiner* — Iftekhar A Khan
(74) *Attorney, Agent, or Firm* — Hanley, Flight and Zimmerman, LLC (57) ABSTRACT

Methods and systems for optimizing additive process parameters for an additive manufacturing process. In some embodiments, the process includes receiving initial additive process parameters, generating an uninformed design of experiment utilizing a specified sampling protocol, next generating, based on the uninformed design of experiment, response data, and then generating, based on the response data and on previous design of experiment that includes at least one of the uninformed design of experiment and informed design of experiment, an informed design of experiment by using the machine learning model and the intelligent sampling protocol. The last process step is repeated until a specified objective is reached or satisfied.

19 Claims, 4 Drawing Sheets

(51) Int. Cl.
  *G06N 20/00* (2019.01)
  *G06F 30/17* (2020.01)
  *G06K 9/62* (2022.01)
  *B33Y 10/00* (2015.01)
  *B33Y 40/00* (2020.01)
  *B33Y 50/02* (2015.01)
  *G06F 111/04* (2020.01)
  *G06F 119/18* (2020.01)

(52) U.S. Cl.
  CPC .............. *G06N 20/00* (2019.01); *B33Y 10/00* (2014.12); *B33Y 40/00* (2014.12); *B33Y 50/02* (2014.12); *G06F 2111/04* (2020.01); *G06F 2119/18* (2020.01)

(58) Field of Classification Search
  USPC ............................................................ 703/2
  See application file for complete search history.

(56) References Cited

U.S. PATENT DOCUMENTS

| | | | | |
|---|---|---|---|---|
| 9,977,425 | B1* | 5/2018 | McCann | G06F 3/12 |
| 10,725,459 | B2* | 7/2020 | Good | G05B 19/404 |
| 2015/0331402 | A1* | 11/2015 | Lin | H04N 1/603 |
| | | | | 700/119 |
| 2017/0232515 | A1* | 8/2017 | DeMuth | G06F 30/20 |
| | | | | 419/53 |
| 2018/0104742 | A1* | 4/2018 | Kottilingam | B33Y 10/00 |
| 2018/0120813 | A1* | 5/2018 | Coffman | G05B 19/401 |
| 2018/0126670 | A1 | 5/2018 | DehghanNiri et al. | |
| 2018/0178287 | A1* | 6/2018 | Mamrak | B29C 64/393 |
| 2018/0246504 | A1* | 8/2018 | Wang | G01M 15/14 |
| 2018/0314234 | A1* | 11/2018 | Zhang | B23K 26/342 |
| 2018/0348734 | A1* | 12/2018 | Berlier | B33Y 50/00 |
| 2019/0034976 | A1* | 1/2019 | Hamedi | G06Q 30/0243 |
| 2019/0049929 | A1* | 2/2019 | Good | G05B 19/4185 |
| 2019/0054700 | A1* | 2/2019 | Chandar | G06F 17/18 |
| 2019/0061261 | A1* | 2/2019 | Chanclon Fernandez | |
| | | | | B29C 64/20 |
| 2019/0070787 | A1* | 3/2019 | Higgs, III | B33Y 50/02 |
| 2019/0122073 | A1* | 4/2019 | Ozdemir | A61B 5/7267 |
| 2019/0315067 | A1* | 10/2019 | Babu | B29C 64/393 |
| 2019/0339670 | A1* | 11/2019 | Tang | G05B 19/4099 |
| 2019/0339671 | A1* | 11/2019 | Yona | B29C 64/393 |
| 2020/0073850 | A1* | 3/2020 | Roychowdhury | B22F 10/20 |
| 2020/0089826 | A1* | 3/2020 | Liu | G06F 30/27 |
| 2020/0147889 | A1* | 5/2020 | Dheeradhada | G06F 30/27 |

FOREIGN PATENT DOCUMENTS

| | | |
|---|---|---|
| WO | 2018091091 A1 | 5/2018 |
| WO | 2018127827 A1 | 7/2018 |
| WO | 2018147887 | 8/2018 |

OTHER PUBLICATIONS

Kristensen et al. (Expected-Improvement-Based Methods for Adaptive Sampling in Multi-Objective Optimization Problems, 2016, ASME, pp. 1-11) (Year: 2016).*

Ghosh et al. (Bayesian Multi-Source Modeling with Legacy Data, AIAA SciTech Forum, 2018, pp. 1-12) (Year: 2018).*

Kumar et al. ( Improving High-Dimensional Physics Models Through Bayesian Calibration With Uncertain Data,2012, ASME, pp. 1-10) (Year: 2012).*

Kappes, Branden et al., "A-30: Machine Learning Approaches to Optimize Additive Manufacturing Parameters for SLM of Inconel 718", Conference Tools for 2017 TMS Annual Meeting & Exhibition, 2017, (pp. 595-610, 16 total pages).

Stoyanov, Stoyan et al., "Machine Learning for Additive Manufacturing of Electronics", 2017 40th International Spring Seminar on Electronics Technology (ISSE), Sofia, Bulgaria, May 10-14, 2017, (pp. 1-6, 6 total pages).

European Patent Office, "Communication pursuant to Article 94(3) EPC," issued in connection with EP Application No. 19204474.1, dated Oct. 7, 2021, 10 pages.

European Patent Office, "Search Report," issued in connection with EP Application No. 19204474.1, dated Apr. 6, 2020, 10 pages.

* cited by examiner

MACHINE LEARNING ASSISTED DEVELOPMENT IN ADDITIVE MANUFACTURING

BACKGROUND

Additive manufacturing is defined as the process of joining materials to make objects from three-dimensional (3D) model data, usually by adding layer upon layer of a material to form a desired object or item (as opposed to subtractive manufacturing methodologies). Synonyms include additive fabrication, additive processes, additive techniques, additive layer manufacturing, layer manufacturing, freeform fabrication, 3D printing, rapid prototyping, and direct digital manufacturing (DDM). Applications of additive fabrication can include net-shape or near-net-shape manufacturing, complex part design, and rapid prototyping. The increased use of additive manufacturing has been changing the way organizations design and manufacture products. In complex assemblies, additive manufacturing can reduce the number of unique parts required by an order of magnitude or more, simplifying the design by reducing or eliminating the need for bolting, welding, brazing or other joining processes. In addition, additive manufacturing enables the design and fabrication of complex geometries not achievable by traditional subtractive manufacturing.

An example of an additive manufacturing device is a 3D printer, which can utilize a variety of technologies to melt, fuse, sinter, amalgamate, or otherwise physically or chemically modify a dispensed material to form a structure that has desired properties. The technologies can include, but are not limited to, direct energy deposition (DED), extrusion deposition, powder melting, powder sintering, binder jetting with powder bed and binder, and light polymerization. Thus, many layers of material are consolidated and/or combined to create the desired product or item. 3D printers are not limited to thin layer deposition/consolidation processes. They can also include bulk rapid fabrication processes such as thermal spray, cold spray, and other deposition processes. The additive manufacturing process thus typically involves the use of a computer and special computer-aided design (CAD) software which provides instructions to the 3D printer causing it to "print" material in the desired shape. 3D printers are not limited to a specific material class, and are now capable of printing metals, ceramics, intermetallics, polymers, biomaterials, semiconductors, and composites. Structures are typically constructed layer by layer, with layer thicknesses ranging from the micron level to the centimeter level, depending on the additive modality.

Conventional additive manufacturing devices require a toolchain which may include a number of different software applications associated with the various steps or stages in the additive fabrication process. Typically, process feedback such as dimensional accuracy, surface finish, defect concentration, and sometimes mechanical property is measured and evaluated manually, with no systematic method of integrating the feedback to improve the process.

3D printers generally have many input parameters that are required to control the device during a print. Adjusting any of these parameters and understanding their impact on part quality in such a multidimensional space, has proven to be difficult. As a result, additive machine parameter development may take many weeks to many months to complete, resulting in high costs and a barrier to entry for any new material systems into the marketplace.

The inventors recognized that a need exists for methods which reduce the development cycles of additive manufacturing processes to reduce overall development time and to reduce associated costs. Accordingly, presented herein are methods which leverage machine learning to build predictive model(s) for specific objectives for materials utilized in an additive manufacturing process, such as relating additive machine parameters to defect concentration, materials behavior, mechanical behavior, or build efficiency.

BRIEF SUMMARY

An embodiment may include a method for optimizing additive process parameters for an additive manufacturing process. In an implementation, the process includes receiving initial additive process parameters, generating an uninformed design of experiment utilizing a specified sampling protocol, and then generating, based on the uninformed design of experiment, response data. The process also includes generating, based on the response data and on previous design of experiment that includes at least one of the uninformed design of experiment and informed design of experiment, an informed design of experiment by using the machine learning model and the intelligent sampling protocol. The processing step which generates the informed design of experiment is then repeated until a specified objective is reached or satisfied.

In some embodiments of the process, the initial additive process parameters may be associated with at least one of material microstructure, material chemistry and material properties, and the material properties may be associated with microstructure of a material. In addition, the response data may be generated by obtaining response data from one of an additively manufactured part or a computer implemented model, and the specified objective may include multiple objectives while the informed design of experiment may include optimization for the multiple objectives, wherein the multiple objectives of the informed design of experiment may include optimizing for at least one specified objective and reducing model uncertainty. The specified objective may also be associated with at least one of an attribute or a property of the material, and the machine learning model may include a probabilistic machine learning process, which may be based on a Bayesian Hybrid Model (BHM) protocol. In addition, the intelligent sampling protocol may be an intelligent design analysis of computer experiments (IDACE), and/or the optimization protocol may be an expect improvement (EI) protocol.

Another embodiment is a computer-implemented process for optimizing additive process parameters for an additive manufacturing process. The computer-implemented process includes receiving initial additive process parameters, generating an uninformed design of experiment utilizing a specified sampling protocol and then generating, based on the uninformed design of experiment, response data. The computer-implemented process also includes generating, based on the response data and on previous design of experiment comprising at least one of the uninformed design of experiment and informed design of experiment, an informed design of experiment by using a machine learning model and the sampling protocol. The computer-implemented processing step which generates the informed design of experiment is then repeated until a specified objective is reached or satisfied.

Some embodiments pertain to a system for optimizing additive machine additive process parameters of a material for use in an additive manufacturing process. The system includes a computer having a processor operably connected to a storage device and a communication device, and a test device operably connected to the computer, wherein the test device includes a test platform for accommodating an additively manufactured part and a plurality of measurement devices that can function to measure properties or attributes associated with a material. The storage device of the computer includes instructions that cause the processor to receive initial additive process parameters, generate an uninformed design of experiment utilizing a specified sampling protocol, then generate, based on the uninformed design of experiment, response data. The instructions next cause the processor to generate, based on one of the response data and material data, and based on previous design of experiment comprising at least one of the uninformed design of experiment and informed design of experiment, an informed design of experiment by using a machine learning model and the sampling protocol, and then to receive, from the test device, material data of a part additively manufactured based on the informed design of experiment. The processing steps which generate the informed design of experiment, and which receive material data from the test device are then repeated until a specified objective is reached or satisfied.

A technical advantage of some embodiments disclosed herein is providing additive process parameters for a material for use in additive manufacturing that have been optimized to satisfy multiple objectives. The information can be used to determine the set of parameters to utilize in the additive manufacturing process for quality versus productivity driven applications. In addition, the disclosed methods and systems can advantageously be used to aid in the screening process for selecting new or different materials, such as new superalloys, for use to additively manufacture selected items or objects. Accordingly, the disclosed methods and systems may therefore provide manufacturers with advantages in speed to market and/or build quality for fabricating parts that are not available to their competitors.

DETAILED DESCRIPTION

In the following detailed description, numerous specific details are set forth in order to provide a thorough understanding of embodiments. However, it will be understood by those of ordinary skill in the art that some of the embodiments may be practiced without these specific details in accordance with the present disclosure. In other instances, well-known methods, procedures, components and circuits have not been described in detail so as not to obscure the embodiments.

In general, and for the purpose of introducing concepts of novel embodiments disclosed herein, presented are methods which utilize machine learning methodology and an intelligent sampling approach along with an understanding of the material being processed to guide the development of, and optimize, the additive manufacturing process. In disclosed embodiments, a machine learning process and intelligent sampling protocol are used to guide build parameter development. The disclosed methods leverage machine learning to build predictive model(s) for specific objectives (such as relating additive process parameters to defect concentration, material behavior, or build efficiency) in a manner that reduces development cycles of additive manufacturing processes. Such models intelligently sample the design space and iteratively improve their accuracy by using feedback from subsequent additively manufactured parts (wherein an additively manufactured part can be of a simple geometry, such as a pin, or may be of a complex geometry). The machine learning assisted framework described herein results in a rapid optimization loop which satisfies a set of specific objectives while only requiring a limited number of build iterations, thus providing optimum additive process parameters under certain conditions (which conditions may include factors such as the environment, particle size distribution, re-coater material, and the like) quicker than conventional processes. Accordingly, informed Design of Experiments (DoE's) are constructed by utilizing the machine learning process to select parameters that both improve model fidelity (by reducing model uncertainty) and optimize the system for a specified objective or objectives. The specified objective may be determined according to various mechanisms, such as being specified by a user, being a default value, being retrieved from a database, or the like. For example, a machine learning model and an intelligent sampling protocol may be used to guide the build parameter development for a selected, hard-to-process superalloy material wherein the objectives are to maximize build speed, minimize structural defects and optimize material properties.

An example additive manufacturing process discussed herein involves fabricating an object using a superalloy, which is a metallic alloy that can be used at high temperatures, often in excess of 0.7 of the absolute melting temperature. However, it should be understood that the intelligent protocols disclosed herein may be used with many different types of materials to reduce development cycles of additive manufacturing processes while at the same time satisfying a set of specific objectives. For example, the disclosed methodology may be utilized for material systems utilizing metals, intermetallics, ceramics, polymers, and the like. Regarding superalloys, such materials can be based on iron, cobalt or nickel, and nickel superalloys have been utilized for applications involving parts fabricated for use in airplane engines and the like. Significant efforts have been made to try to optimize the additive process parameters for such hard to process superalloys. But using traditional development protocols to optimize the additive process parameters for a single alloy can take a significant amount of time and resources. Accordingly, in order to reduce the time and costs associated with the development cycle for such materials, an intelligent protocol such as that disclosed herein is necessary.

Figure 1:
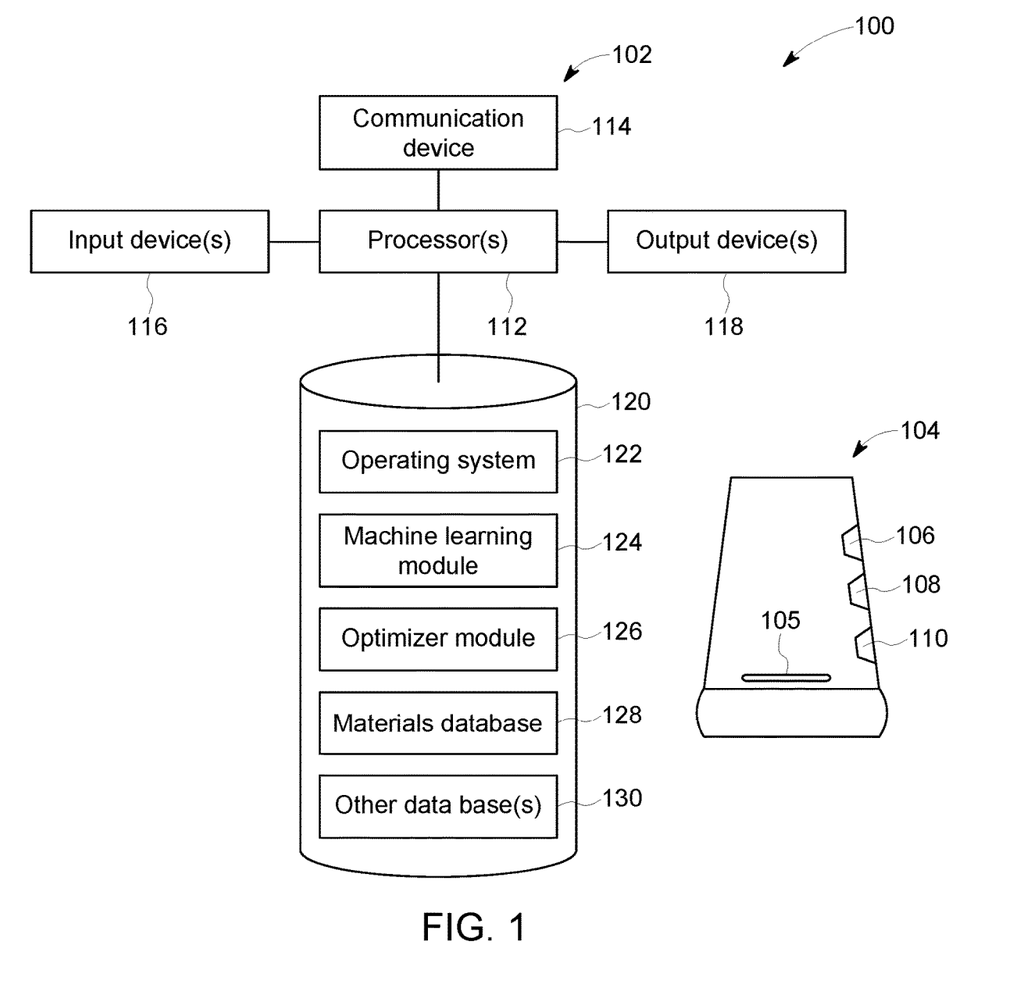
FIG. 1 is a block diagram of a system that leverages a machine learning process and an intelligent sampling approach to guide the development and optimization of additive machine parameters in accordance with some embodiments of the disclosure.

FIG. 1 is a block diagram of a system 100 that leverages a machine learning process and an intelligent sampling approach to guide the development and optimization of an additive manufacturing process in accordance with some embodiments disclosed herein. The system 100 includes a computer 102 and a test device 104. Although the computer 102 is depicted as a stand-alone device, some or all functions ascribed to it may be performed by a computer system and/or computer network and/or other electronic components, which may be operated by an operator or user having experience with the material being processed. In particular, in some embodiments of the processes described herein, the initial additive process parameters data (input data) is provided by an operator having experience with the material of interest.

Referring again to FIG. 1, in some embodiments the test device 104 includes a test platform 105 for receiving a test sample (not shown), and measurement devices 106, 108, 110 to measure different attributes associated with the test sample. The test device 104 may be utilized to provide measurements during a build, or may be used to provide measurements after a workpiece (a part) has been built. The measurement devices may include, for example, a microscope 106 to measure the defect concentration in a build volume. Defects of interest may include, for example, porosity, lack of fusion defects, cracking, and surface roughness. The measurement device 108 may be a mechanical evaluation device utilized for evaluating the mechanical properties of the material or part. An example of a mechanical evaluation device includes, but is not limited to, a test frame equipped with a furnace, a displacement sensor or strain sensor, and a load cell, so that tensile, compression, creep, and fatigue information can be measured. Environmental resistance measurement equipment 110 may also be used to evaluate, for example, oxidation and corrosion resistance of the material or test part(s). Some implementations may include more or less measurement devices, and such measurement devices could be used to measure additional or other characteristics depending on the material and/or experiment design. In some embodiments, the test device 104 transmits measurement data to the computer 102, such as data characterizing the test sample or material under consideration, for comparison to data obtained from one or more predictive model(s) which were developed to obtain specific objectives. In some implementations, the test device 104 and/or the measurement devices 106, 108, 110 can communicate with the computer 102 via a wired or a wireless communication protocol.

The computer 102 illustrated in FIG. 1 may be, for example, a personal computer, a laptop computer, or a tablet computer, and can be controlled by software and/or instructions to cause it to function as described herein. In addition, the computer 102 may be a special purpose computer, and thus may be specially configured and/or include specialized components to perform the functions described herein. Thus, in some embodiments the computer 102 includes one or more processor(s) 112 operatively coupled to a communication device 114, an input device 116, an output device 118, and a storage device 120. The communications device 114 may be configured for receiving data from the test facility 104 and may also be configured to transmit instructions and/or data to the test facility 104. In addition, the processor 112 is operable to execute processor-executable steps, contained in program instructions described below, to control the computer 102 to provide desired functionality.

The communication device 114 may be used to facilitate communication with, for example, other devices (such as other computing devices). Communication device 114 may include numerous communication ports (not separately shown), to allow the computer 102 to communicate simultaneously with a number of other computers and/or other devices, including communications as required to simultaneously handle numerous interactions with other devices which may be associated with testing operations as described herein.

Input device 116 may include one or more of any type of peripheral device typically used to input data into a computer. For example, the input device 116 may include a touchscreen, a keyboard, and a mouse. Similarly, the output device 118 may include one or more typical computer output components, for example, a display screen (or touchscreen) and/or an audio speaker, and/or a printer, and the like.

Storage device 120 may include any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as flash memory and the like. Any one or more of such information storage devices may be considered to be a non-transitory computer-readable storage medium or a computer usable medium or a memory. The storage device 120 stores one or more computer programs for controlling the processor(s) 112. The computer programs may include program instructions (which may be referred to as computer readable program code) that contain processor-executable process steps of the computer 102, executed by the processor(s) 112 to cause the computer system 102 (and/or other computer systems) to function as described herein.

The storage device 120 may include a plurality of computer programs including one or more operating systems 122 that control the processor(s) 112 to manage and coordinate activities and sharing of resources in the computer 102, and to serve as a host for application programs that run on the computer 102. The programs stored in the storage device 120 may include, for example, a machine learning module 124 which includes instructions for developing an objective specific predictive model. In some embodiments, a Bayesian Hybrid Model (BHM) is utilized as the machine learning model to develop an objective specific predictive model, but it should be understood that many other different types of machine learning models could be used instead of BHM.

Referring again to FIG. 1, another program that may be stored in the storage device 120 is an optimizer module 126 that is able to optimize for defined specific objective(s), and which may be configured for including one or more additional constraints for arriving at an optimal material build solution (for example, staying within a specific power to speed ratio). The storage device 120 may also store other programs (not shown) such as communications software, and one or more output report applications that may respond to requests from a user, for example, to provide visual display(s) (such as a graph) on a display screen (output device 118) which may be associated with experimental output data obtained by the computer 102. The other programs may also include, for example, device drivers, database management software, and the like.

As also shown in FIG. 1, the storage device 120 may store a materials database 128 that includes data characteristic of one or more build properties associated with one or more materials of interest that could be utilized in an additive manufacturing process. In addition, the storage device 120 may include one or more other databases 130 having data that may be required for operation of the computer 102.

Figure 2:
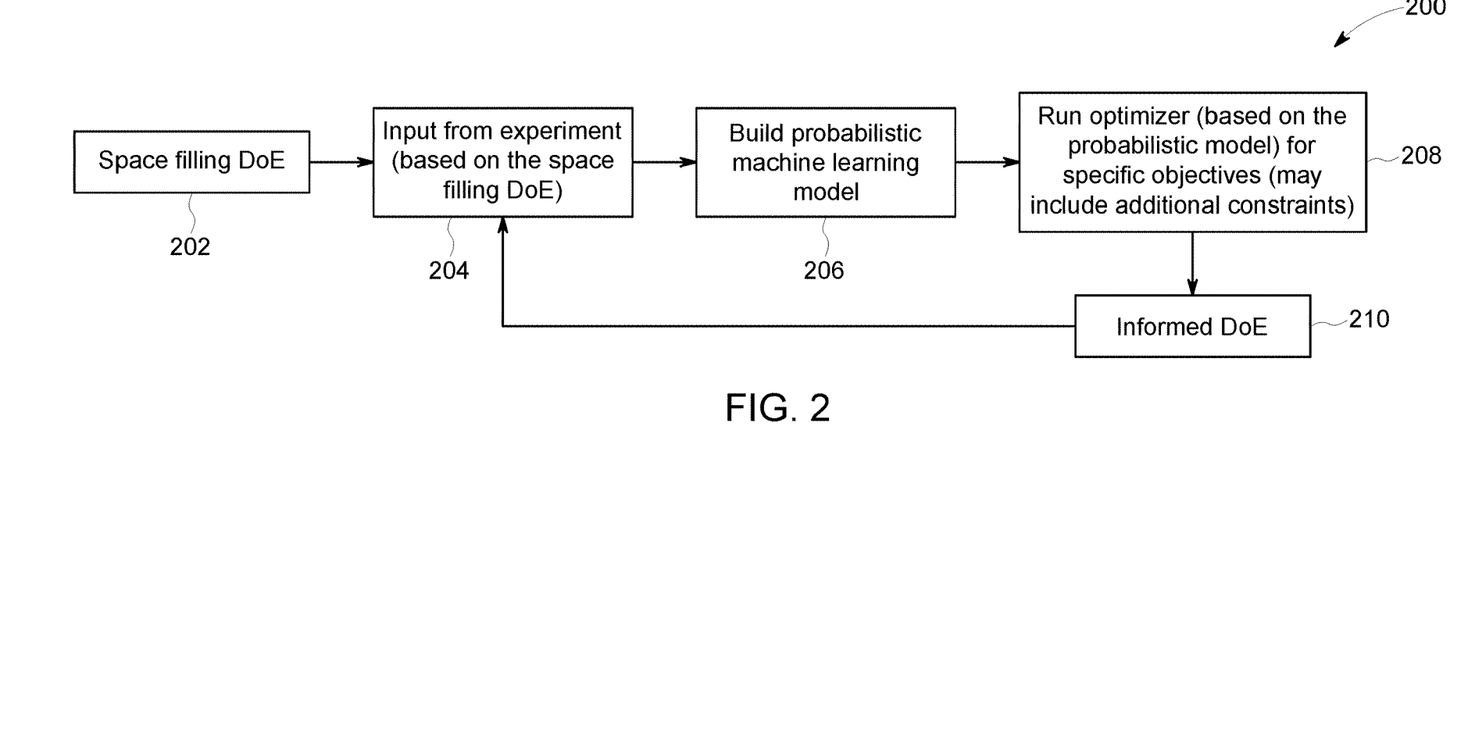
FIG. 2 illustrates a machine learning assisted development protocol in accordance with embodiments of the disclosure.

FIG. 2 is a block diagram illustrating a machine learning assisted development protocol 200 in accordance with some embodiments. The development protocol 200 includes a Design of Experiment (DoE) 202, which is utilized to obtain specific combinations of input data parameters that are to be varied in a current experiment. Some examples of additive machine input parameters for an additive manufacturing process are laser power data, laser speed data, and the like, on a direct metal laser melting (DMLM) modality. The DoE 202 can be of many different types including factorial and space filling designs, which in some embodiments may be selected by an operator. In an example, a latin hypercube sampling (LHS) approach can be utilized as a space filling DoE methodology. A space filling DoE offers significant advantages over factorial DoE such as independence in the number of points that can be chosen irrespective of the dimensions and spreading points uniformly over the design space, while also being significantly less expensive in most, if not all, cases.

Referring again to FIG. 2, at each condition sampled by the DoE, an experiment is conducted 204. In the case of additive manufacturing, the parts are printed at the selected settings of the DoE, and measurements are then made of properties or quantities of interest (for example, measurements can be made by one or more of the measurement devices 106, 108, 110 of the test device 104 of FIG. 1). Typical quantities of interest may include, for example, porosity, tensile properties, fatigue properties, and the like. Next, the process 200 focuses on building 206 a probabilistic machine learning model that can predict the quantities of interest given the input parameters. The probabilistic aspect of the machine learning model enables an estimate of the model uncertainty, which accompanies each model prediction. This establishes the quality of the prediction, iteration-by-iteration, and may determine where the model is predicting well, and where the model requires more data. In some implementations, the machine learning models can be of a regressive type, which predict continuous outputs. Regressing machine learning models are usually of two types: parametric models or non-parametric models. Parametric machine learning models assume an inherent form that describes how the output varies as a function of inputs, such as a polynomial form in the case of a linear regression. Non-parametric models do not assume an overall form, but rather tend to learn the model form from the data based on certain kernel functions (or activation functions). For example, artificial neural networks (ANNs) generally use a logistic kernel function, whereas the Gaussian process model (GP) typically uses a Gaussian. Almost all of the aforementioned machine learning methods can be made probabilistic, which is a key requirement for an intelligent and iterative experimental design.

In some cases, a Bayesian Hybrid Model (BHM) (based on Gaussian Process Model) can be utilized as the machine learning model. The uncertainty information from the probabilistic machine learning model can be utilized to intelligently design the experiments through use of a feedback loop. This brings us to an intelligent sampling protocol. Based on the uncertainty from the machine learning model, along with an understanding of the material being processed, the intelligent sampling protocol provides the next set of informed DoE, i.e., machine parameters, that can either reduce the overall model uncertainty or provide values that are closer to the optimal values of the specified quantities of interest. An optimizer process 208, which is based on the probabilistic model for specific objectives, such as the quantities of interest mentioned before, can then be utilized. Intelligent Design of Computational Experiments (IDACE) or Expect Improvement (EI) protocols, for example, have been used as the intelligent sampling protocol in some implementations. IDACE-based optimization is useful for identifying the optimal solutions for a multi-objective, high-dimensional optimization problem having many constraints with a much-reduced number of function evaluations. This goal is accomplished by four components of the approach: (a) a Bayesian Gaussian Process-based surrogate model that is capable of approximating highly non-linear responses in high dimensions with relatively sparse training data, (b) hyper-volume based expected improvement when new data points are added, (c) utilization of global optimization methods to identify the next best points that maximizes the expected improvement function, and (d) efficient constraint handling through penalization of the expected improvement (EI) formulation. This methodology has been shown to be superior to using general optimization methods on both analytical functions and industrial optimization problems. The optimizer process 208 optimizes for specific objective (s) using the intelligent sampling protocol. For example, objectives may include reduction of model uncertainty as well as minimizing defect concentration in the build structure. One or more additional constraints may also be included, for example, a constraint requiring the optimal solution to stay within a specific power to speed ratio, or a constraint to stay within a specified meltpool width (for a DMLM process). The output of the optimizer process 208 is a new set of informed DoE input settings 210, which is fed back to the input from experiment 204 to perform another iteration. The feedback loop thus constitutes performing the experiments, quantifying the outputs of interest 204, and updating the machine learning model 206 with the newly collected data for further iterations. The protocol involves running a number "N" amount of iterations until one or more predetermined objective(s) is/are met, such as reaching a specified uncertainty threshold value, or reaching a desired optimal level in the quantities of interest, while also satisfying all imposed constraints.

Figure 3:
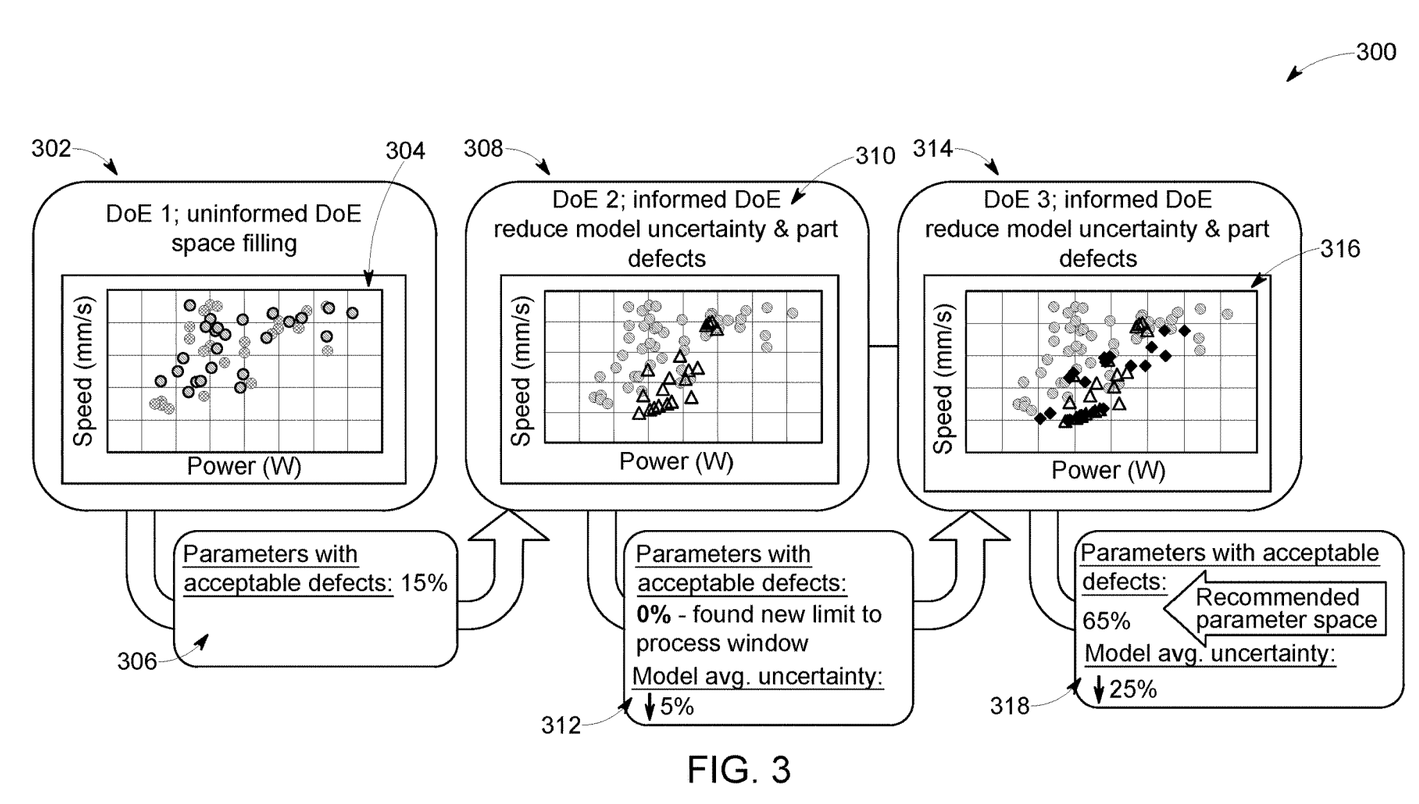
FIG. 3 is a diagram illustrating an example of an application of the machine learning and intelligent sampling approach for developing parameters for a material in accordance with embodiments of the disclosure.

FIG. 3 is a diagram 300 illustrating an example of an application of the machine learning and intelligent sampling approach for developing parameters for a selected hard-to-process alloy according to some embodiments. In a first Design of Experiment (DoE) 302 (which is an uninformed DoE), build parameter sets associated with an understanding of the material being processed (the alloy) are generated by varying selected additive process parameters (for example, power and speed). In this example, a total of forty-eight (48) unique parameters are shown within the graph 304 as circles. An additively built sample from each build parameter is then characterized to determine, for example, the defect concentration present in the material (the alloy). As indicated by the information box 306, less than fifteen percent (15%) of the total additive process parameters met the build quality requirement in this example.

Referring again to FIG. 3, the process continues with the next step, inputting the defect concentration data and additive process parameters into a machine learning algorithm. In this example, the machine learning algorithm chosen was the Bayesian Hybrid Model (BHM). The intelligent iterative design process chosen was Intelligent Design of Computer Experiments (IDACE) that uses the predictive model (which was built based on experimental data) to inform the next experimental points. The BHM model was utilized to select the next set of additive process parameters to both improve model fidelity and to optimize for the desired objective. An example of a desired objective, shown in this example, is to minimize defect concentration. The next set of additive process parameters for the second DoE 308 (an informed DoE) are shown plotted as triangles on the graph 310, which includes a total of twenty-four (24) unique additive process parameters suggested for this iteration. After building specimens according to the second DoE, a sample from each build parameter set was characterized for defect concentration, and as shown in information box 312, the model uncertainty was reduced by 5% with this iteration.

The experimental results along with additive process parameters from the first (uninformed) DoE 302 and the second (informed) DoE 308 are then input into the machine learning algorithm. The BHM model is then updated with all available data, and using the IDACE methodology, the next set of additive process parameters is suggested. The selected goals of this iteration are to improve model fidelity and minimize defect concentration. Thus, coordinates for the third (informed) DoE 314 are shown plotted as diamonds on the graph 316 and, as indicated in information box 318, there is significant improvement in both model fidelity and acceptable build parameter process window. In particular, the model uncertainty was reduced by twenty-five percent (25%). Additionally, the intelligent DoE process parameter guidance improved the outcome of the experiments, with 65% of the selected parameter sets producing microstructures with acceptable defect concentrations. Thus, in this example 300, the third iteration (third DoE 314) generated a robust scheme of additive process parameters for a hard to process alloy, and the objective is met.

Figure 4:
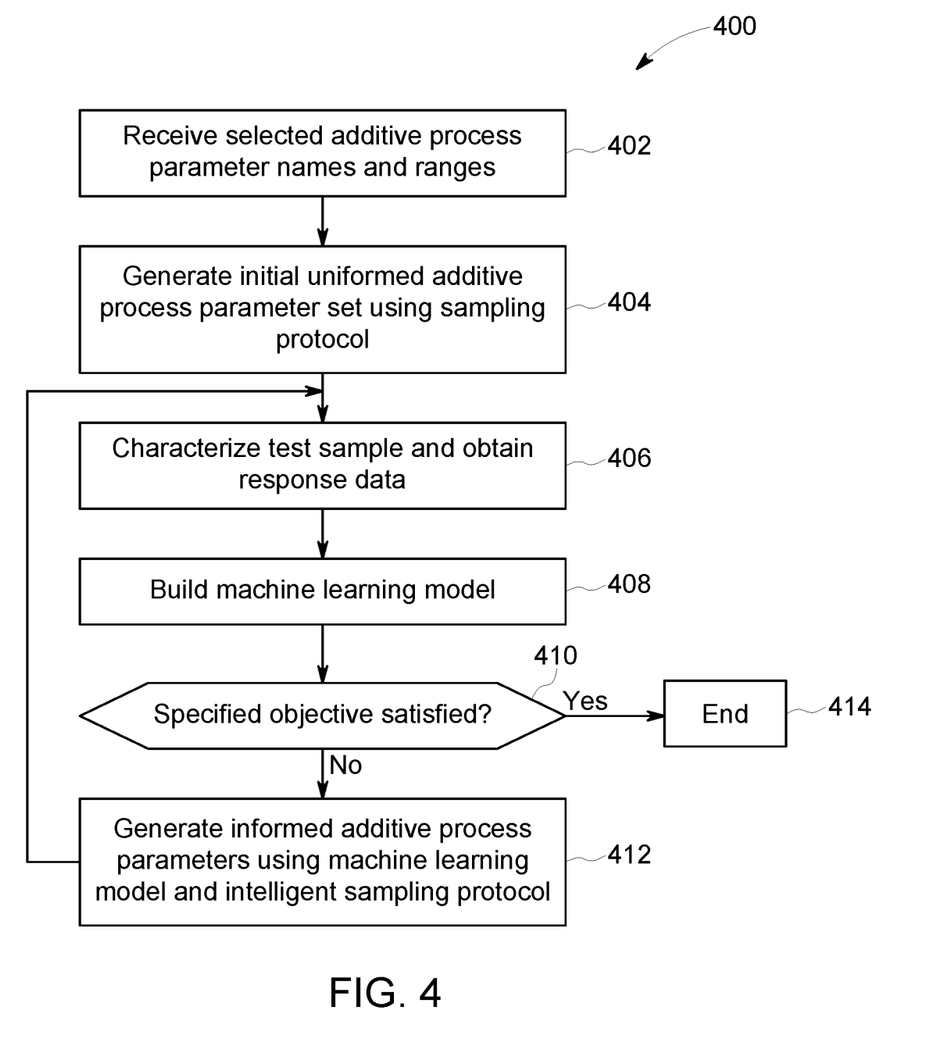
FIG. 4 is a flowchart of a process for optimizing additive process parameters for a material for use in an additive manufacturing process according to embodiments of the disclosure.

FIG. 4 illustrates a flowchart of process 400 for optimizing additive process parameters for a material for use in an additive manufacturing process according to some embodiments. Satisfaction of one or more specified objectives for fabricating a part made out of the material may be a goal of the process 400. For example, a specified objective can be to reduce model uncertainty, or to optimize for one or more other specified requirements (i.e., optimize to obtain an acceptable defect concentration), or both. In some implementations, however, the method may be utilized to obtain additive process parameters to optimize a machine learning model, for example. Thus, other types of objectives or goals could be the purpose of the process.

Referring to FIG. 4, in some implementations, a computer receives 402 the selected additive process parameter names and their ranges which are associated with a specific material and machine of interest (such as an alloy or ceramic material for use in an additive manufacturing operation). Examples of additive process parameters include, but are not limited to, laser parameters (power, speed, trace spacing, spot-size, etc.), build parameters (gas flow, recoater direction, etc.), and material parameters (e.g., powder properties).

Referring again to FIG. 4, an initial uninformed additive process parameter set is generated 404 via a specified sampling protocol (for example, space filling DoE, factorial or other type of traditional DoE, or any sampling protocol). As with the specified objective, the specified sampling protocol may be selected by a user, retrieved from a database, or coded as a default value. In some embodiments, test samples are then additively built using the uninformed additive process parameters. These test samples can then be characterized according to the specified requirements for attributes such as defect concentration, material behavior, material mechanical properties, environmental resistance, material's microstructure, thermal behavior, corrosion properties and the like to obtain response data 406. In some other implementations, if material models are available to predict the specified requirements, the process may choose to rely on such model predictions as representing response data, rather than or instead of physically measuring properties of the specimens. In either case, the computer then builds 408 a machine learning model based on the uninformed additive process parameters and the response data. At this point, the process includes determining 410 whether a specified objective is met or satisfied. If the specified objective is not satisfied, the computer then generates 412 informed additive process parameters by using the machine learning model and the intelligent sampling protocol. The process then branches back to step 406 to characterize and obtain the response data. A machine learning model is then built 408, and if it is determined 410 that the specified objective is met or satisfied, then the process ends 414, and in some implementations, the computer may display an output indication, for example, to the user via an output device (such as a display screen) indicating results. However, if the specified objective is again not satisfied, then another iteration of the process (branch back to step 406) occurs and further informed additive process parameters are generated (step 412), which in some embodiments may include generating a further informed design of experiment (DoE) by using the machine learning model and a sampling protocol.

In some embodiments of the process 400, determining 410 if the specified objective is met (such as a model average uncertainty value being equal to or less than a predetermined target value) may include reaching a target value (or reaching a value within a target range) associated with an attribute (or attributes) or a property (or properties) of the material as a design criteria goal (or goals) of the process. For example, if the specified objective is to reduce the model uncertainty, the machine learning model 408 is used to determine the average model uncertainty and the outcome checked against a specified target limit. For example, a specified objective may be defect concentration, wherein the goal is to fabricate a part having a defect concentration that is less than or equal to a particular defect concentration value. In this case of the objective being defect concentration, the machine learning model 408 itself may not be needed to determine if the defect concentration at an iteration of the process 400 satisfies the specified attributes/limits. Thus, when an iteration of the process 400 satisfies such a specified attribute(s), an output indication may be provided, and the process ends (step 414). If that specified attribute is not satisfied, then the process branches back again (to step 406). Thus, in such embodiments, the computer performs iterations based on the previous informed and uninformed additive process parameters using the machine learning model and the intelligent sampling protocol until the specified attribute(s) is/are satisfied.

Accordingly, disclosed herein are methods and systems for machine learning assisted development in additive manufacturing that can be used to accelerate the development cycles of parts that are manufactured using an additive manufacturing process. For example, the DMLM example process described herein accelerates the development cycle of parts manufactured using an additive manufacturing process by from about thirty percent to about sixty percent (30%-60%). In some embodiments, a machine learning model is combined with an intelligent sampling approach which processes data in an iterative manner to identify the optimal additive process parameters for the material being processed. Accordingly, in some examples provided herein, a difficult-to-process alloy is processed, wherein initial input data may be provided by an operator having an understanding of physical metallurgy. Thus, the disclosed methods and systems can also be beneficially utilized to find optimal additive process parameters for new alloy systems, new applications for current alloys, for machine process refinement, and/or for use with different machine platforms (including machine upgrades). Furthermore, the disclosed methods and systems can advantageously be used to aid in the screening process for selecting new or different materials, such as new superalloys, for an additive manufacturing of selected items or objects. The disclosed process can advantageously be applied to a small dataset (less than twenty (20) data points) or to a large dataset (thousands of data points). The intelligent design and machine learning methodology described herein offers significant improvement, not only in development cycles (i.e., shortens the length of development cycles), but also in reduction of required resources (i.e. a reduction in the number of experiments, reduced raw material costs, and reduced labor costs). The process can therefore advantageously provide additive process parameters that have been optimized to satisfy multiple objectives for any particular material, and such information can be used to determine the set of parameters for quality versus productivity driven applications. Accordingly, the disclosed methods and systems may therefore provide manufacturers with advantages in speed to market and/or build quality for fabricating parts that are not available to their competitors.

This detailed description uses examples to disclose the invention and also to enable any person skilled in the art to practice the invention, including making and using any devices or systems and performing any incorporated methods. The scope of the invention is defined by the claims, and may include other examples that occur to those skilled in the art. Such other examples are contemplated as being within the scope of the claims if they have structural elements that do not differ from the literal language of the claims, and/or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and/or techniques in accordance with principles disclosed herein.

Accordingly, the present invention has been described in terms of several embodiments solely for the purpose of illustration. Persons skilled in the art will recognize from this description that the invention is not limited to the embodiments described, but may be practiced with modifications and/or alterations limited only by the spirit and scope of the appended claims.

What is claimed is:

1. A method for optimizing additive process parameters for an additive manufacturing process, comprising:
   (a) receiving, at a computing device, initial additive process parameters;
   (b) generating, using the computing device, an uninformed design of experiment utilizing a specified sampling protocol to vary the initial additive process parameters in a design space;
   (c) generating, using the computing device based on execution of the uninformed design of experiment in a first process, first response data;
   (d) generating, using the computing device and a machine learning model based on the first response data, a specified objective for the additive manufacturing process, the sampling protocol, and on previous design of experiment comprising at least one of the uninformed design of experiment and a prior informed design of experiment, an informed design of experiment;
   (e) evaluating, using the computing device, the specified objective with respect to second response data produced in a second process execution of the informed design of experiment; and
   (f) iteratively repeating steps (d)-(e) until the specified objective is satisfied.

2. The method of claim 1, wherein the initial additive process parameters are associated with at least one of material microstructure, material chemistry and material properties.

3. The method of claim 2, wherein the material properties are associated with microstructure of a material.

4. The method of claim 1, wherein generating the first response data comprises obtaining the first response data from one of an additively manufactured part or a computer implemented model executing the first process.

5. The method of claim 1, wherein the specified objective comprises multiple objectives and the informed design of experiment comprises optimization for the multiple objectives.

6. The method of claim 5, wherein the multiple objectives of the informed design of experiment comprises optimizing for at least one specified objective and reducing model uncertainty.

7. The method of claim 1, wherein the specified objective is associated with at least one of an attribute or a property of a material.

8. The method of claim 1, wherein the machine learning model comprises a probabilistic machine learning process.

9. The method of claim 8, wherein the probabilistic machine learning process is based on a Bayesian Hybrid Model (BHM) protocol.

10. The method of claim 1, wherein the specified sampling protocol comprises intelligent design analysis of computer experiments (IDACE).

11. The method of claim 1, wherein the specified sampling protocol comprises an expect improvement (EI) protocol.

12. A computer-implemented process for optimizing additive process parameters for an additive manufacturing process, comprising:
    (a) receiving, at a computing device, initial additive process parameters;
    (b) generating an uninformed design of experiment utilizing a specified sampling protocol to vary the initial additive process parameters in a design space;
    (c) generating, based on execution of the uninformed design of experiment in a first process, first response data;
    (d) generating, using a machine learning model based on the first response data, a specified objective for the additive manufacturing process, the sampling protocol, and on previous design of experiment comprising at least one of the uninformed design of experiment and a prior informed design of experiment, an informed design of experiment;
    (e) evaluating, using the computing device, the specified objective with respect to second response data produced in a second process execution of the informed design of experiment; and
    (f) iteratively repeating steps (d)-(e) until the specified objective is satisfied.

13. The computer-implemented process of claim 12, wherein generating the first response data comprises obtaining the first response data from one of an additively manufactured part or a computer implemented model.

14. The computer-implemented process of claim 12, wherein step (f) further comprises generating the informed design of experiment until multiple specified objectives are optimized.

15. The computer-implemented process of claim 14, wherein one of the multiple specified objectives comprises reducing model uncertainty.

16. A system for optimizing additive machine additive process parameters of a material for use in an additive manufacturing process comprising:
 a computer comprising a processor operably connected to a storage device and a communication device; and
 a test device operably connected to the computer, the test device comprising a test platform for accommodating an additively manufactured part and a plurality of measurement devices;
 wherein the storage device of the computer comprises instructions that cause the processor to:
 (a) receive initial additive process parameters;
 (b) generate an uninformed design of experiment utilizing a specified sampling protocol to vary the initial additive process parameters in a design space;
 (c) generate, based on execution of the uninformed design of experiment in a first process, first response data;
 (d) generate, using a machine learning model and the sampling protocol based on one of the first response data and first material data, and based on previous design of experiment comprising at least one of the uninformed design of experiment and a prior informed design of experiment, an informed design of experiment;
 (e) receive, from the test device, second material data of a part additively manufactured based on the informed design of experiment;
 (f) evaluate a specified objective with respect to the material data produced in a second process execution of the informed design of experiment; and
 (g) repeat steps (d)-(f) until the specified objective is satisfied.

17. The system of claim 16, wherein generating the first response data comprises obtaining the first response data from a computer implemented model.

18. The system of claim 16, wherein repeating steps (c) and (d) further comprises generating the informed design of experiment until multiple specified objectives are optimized.

19. The system of claim 18, wherein one of the multiple specified objectives comprises reducing model uncertainty.

* * * * *